United States Patent
Kanza et al.

(10) Patent No.: US 12,153,915 B2
(45) Date of Patent: Nov. 26, 2024

(54) TESTING ACCESSIBILITY OF GEOSPATIAL APPLICATIONS USING CONTEXTUAL FILTERS

(71) Applicant: AT&T Intellectual Property I, L.P., Atlanta, GA (US)

(72) Inventors: Yaron Kanza, Fair Lawn, NJ (US); Balachander Krishnamurthy, New York, NY (US); Divesh Srivastava, Summit, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 116 days.

(21) Appl. No.: 17/933,477

(22) Filed: Sep. 19, 2022

(65) Prior Publication Data

US 2024/0095008 A1    Mar. 21, 2024

(51) Int. Cl.
  *G06F 8/65* (2018.01)

(52) U.S. Cl.
  CPC ..................... *G06F 8/65* (2013.01)

(58) Field of Classification Search
  CPC ..... G06F 8/65; G06F 8/00; G06F 8/70; G06F 8/76
  USPC ......................................................... 717/168
  See application file for complete search history.

(56) References Cited

U.S. PATENT DOCUMENTS

| | | | | |
|---|---|---|---|---|
| 11,055,208 | B1* | 7/2021 | Pandurangarao | G06F 11/3692 |
| 2015/0370597 | A1* | 12/2015 | Faaborg | G06N 5/04 718/102 |
| 2020/0257179 | A1* | 8/2020 | Barnum | H04L 63/0876 |
| 2020/0285464 | A1* | 9/2020 | Brebner | G06F 11/362 |
| 2021/0099358 | A1* | 4/2021 | Nishizaki | H04L 67/561 |
| 2021/0150489 | A1* | 5/2021 | Haramati | G06Q 10/063114 |
| 2021/0293566 | A1* | 9/2021 | He | G01C 21/3647 |
| 2022/0092607 | A1* | 3/2022 | Jeske | G06Q 30/018 |
| 2022/0237483 | A1* | 7/2022 | Mossler | G06N 5/04 |

(Continued)

OTHER PUBLICATIONS

Bakillah et al, "Toward a collective tagging Android application for gathering accessibility-related geospatial data in European cities.", 2014, [Online], pp. 1-6, [Retrieved from internet on Jul. 7, 2024], <chrome-extension://efaidnbmnnnibpcajpcglclefindmkaj/https://www.researchgate.net/profile/Adam> (Year: 2015).*

(Continued)

*Primary Examiner* — S. Sough
*Assistant Examiner* — Zengpu We

(57) ABSTRACT

A method performed by a processing system including at least one processor includes applying a contextual filter to mask a portion of at least one of: an input of a software application, an output of the software application, or an underlying dataset of the software application, where the contextual filter simulates a limitation of a user of the software application, executing the software application with the contextual filter applied to the at least one of: the input of the software application, the output of the software application, or the underlying dataset of the software application, collecting ambient data during the executing, and recommending, based on a result of the executing, a modification to the software application to improve at least one of: an accessibility of the software application or an inclusion of the software application.

20 Claims, 3 Drawing Sheets

(56) References Cited

U.S. PATENT DOCUMENTS

2023/0036410 A1* 2/2023 Moyal ................ G06F 11/3692

OTHER PUBLICATIONS

Yaron Kanza et al., "Geospatial Accessibility and Inclusion by Combining Contextual Filters, the Metaverse and Ambient Intelligence," SIGSPATIAL '22, Seattle, WA, USA © 2022 ACM, 4 pages.

* cited by examiner

TESTING ACCESSIBILITY OF GEOSPATIAL APPLICATIONS USING CONTEXTUAL FILTERS

The present disclosure relates generally to geospatial applications, and relates more particularly to devices, non-transitory computer-readable media, and methods using contextual filters to test the accessibility and inclusion of geospatial applications.

BACKGROUND

Geospatial technology includes hardware and software applications that integrate geographical and non-geographical data. Example geospatial applications may include, for instance, navigation applications that compute routes from user locations to specified destinations (and may provide turn-by-turn directions along the way), location-based augmented reality games that allow players to interact with virtual objects that are anchored to specific real world locations, location-based recommendation systems that recommend facilities, businesses, or the like based on a user's current or specified location, and other applications.

SUMMARY

The present disclosure broadly discloses methods, computer-readable media, and systems for using contextual filters to test the accessibility and inclusion of geospatial applications. In one example, a method performed by a processing system including at least one processor includes applying a contextual filter to mask a portion of at least one of: an input of a software application, an output of the software application, or an underlying dataset of the software application, where the contextual filter simulates a limitation of a user of the software application, executing the software application with the contextual filter applied to the at least one of: the input of the software application, the output of the software application, or the underlying dataset of the software application, collecting ambient data during the executing, and recommending, based on a result of the executing, a modification to the software application to improve at least one of: an accessibility of the software application or an inclusion of the software application.

In another example, a non-transitory computer-readable medium may store instructions which, when executed by a processing system including at least one processor, cause the processing system to perform operations. The operations may include applying a contextual filter to mask a portion of at least one of: an input of a software application, an output of the software application, or an underlying dataset of the software application, where the contextual filter simulates a limitation of a user of the software application, executing the software application with the contextual filter applied to the at least one of: the input of the software application, the output of the software application, or the underlying dataset of the software application, collecting ambient data during the executing, and recommending, based on a result of the executing, a modification to the software application to improve at least one of: an accessibility of the software application or an inclusion of the software application.

In another example, a device may include a processing system including at least one processor and a non-transitory computer-readable medium storing instructions which, when executed by the processing system, cause the processing system to perform operations. The operations may include applying a contextual filter to mask a portion of at least one of: an input of a software application, an output of the software application, or an underlying dataset of the software application, where the contextual filter simulates a limitation of a user of the software application, executing the software application with the contextual filter applied to the at least one of: the input of the software application, the output of the software application, or the underlying dataset of the software application, collecting ambient data during the executing, and recommending, based on a result of the executing, a modification to the software application to improve at least one of: an accessibility of the software application or an inclusion of the software application.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

Figure 1:
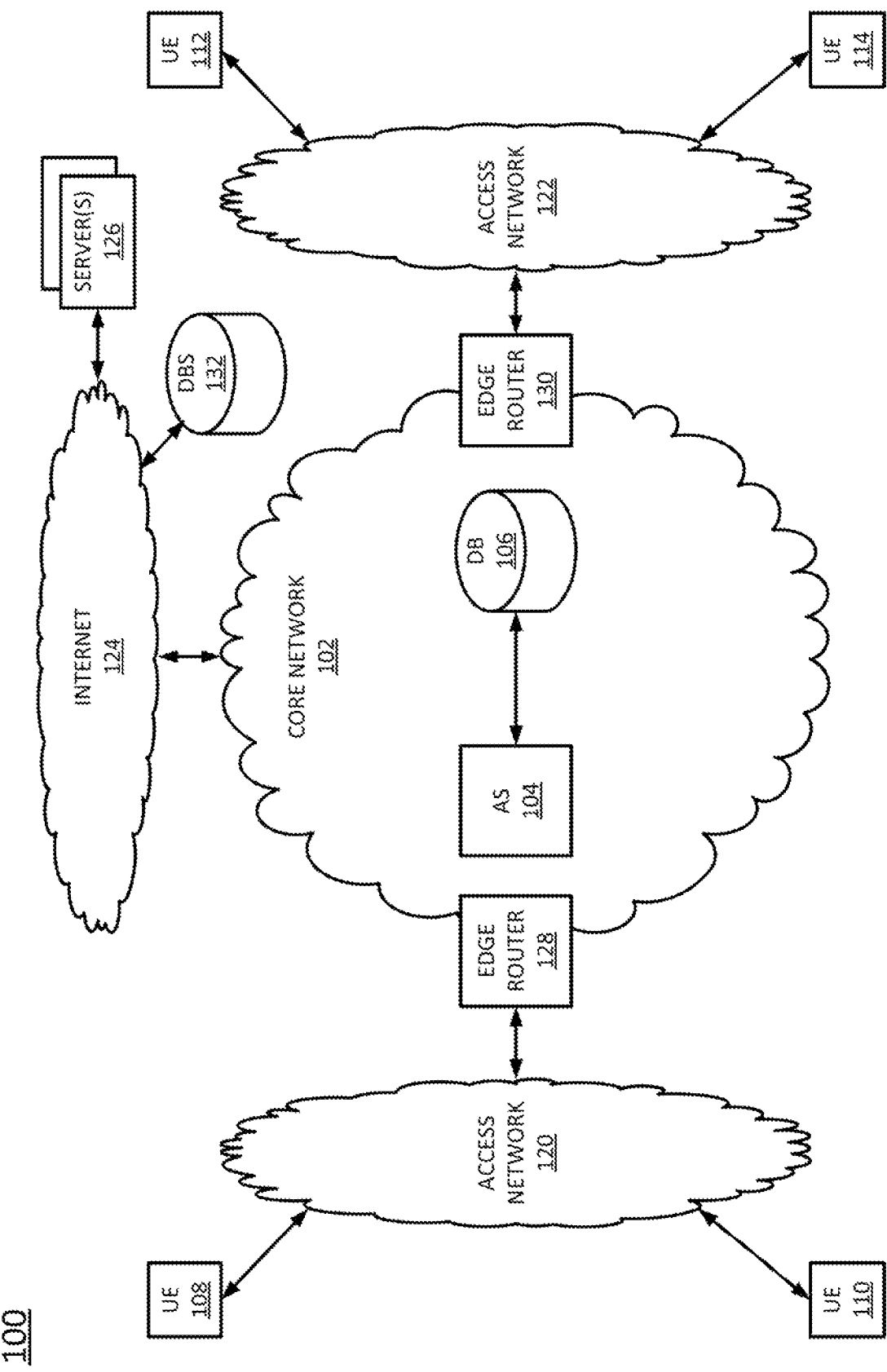
FIG. 1 illustrates an example system in which examples of the present disclosure for using contextual filters to test the accessibility and inclusion of geospatial applications may operate.

The present disclosure broadly discloses methods, computer-readable media, and systems using contextual filters to test the accessibility and inclusion of geospatial applications. As discussed above, geospatial technology includes hardware and software applications that integrate geographical and non-geographical data. Example geospatial applications may include, for instance, navigation applications that compute routes from user locations to specified destinations (and may provide turn-by-turn directions along the way), location-based augmented reality games that allow players to interact with virtual objects that are anchored to specific real world locations, location-based recommendation systems that recommend facilities, businesses, or the like based on a user's current or specified location, and other applications. The development of geospatial applications provides new challenges for ensuring accessibility and inclusion of those applications. Within this context, "accessibility" refers to the ability to provide a similar experience to all users of an application, including users of varying abilities. "Inclusion" refers to the ability to ensure that all potential users of an application are able to utilize the application to any extent including the greatest possible extent.

As an example, a navigation application may display roads that are experiencing heavy (e.g., greater than a threshold) traffic flow in red, while roads that are experiencing normal (e.g., below a threshold) traffic flow may be displayed in green. A user who is color blind, however, may have difficulty distinguishing between the red and green roads, and may therefore miss key information conveyed by the application. Alternatively, the navigation application's voice command feature may have difficulty recognizing speech that is uttered with specific accents, or the navigation application's audible instructions may not be clear or loud enough to be understood by users who have hearing loss. As another example, a pedestrian or public transportation route that is generated by the navigation application may be difficult for a user with mobility concerns to navigate (e.g., a user using crutches, a wheelchair, or pushing a stroller may have difficulty accessing a subway station that does not have an elevator or walking up a steep hill).

Geospatial bias can also affect the inclusion of geospatial applications. For instance, a location-based augmented reality game may allow players to interact with virtual objects. If the virtual objects are anchored to specific real world locations (such as landmarks, businesses, and the like, which may be present in significantly higher proportions in wealthy urban areas than in less wealthy areas, suburban areas, and rural areas), then the game may provide greater opportunities for interaction with the virtual objects in those wealthy urban areas, such that users residing in the less wealthy areas, suburban areas, and rural areas have fewer opportunities to participate.

Furthermore, poor accessibility and inclusion can affect wearable devices as well as hardware and software applications. For instance, farsighted and/or nearsighted users may have difficulty using virtual reality headsets. Moreover, users who are using the wearable devices at different times (e.g., daytime versus nighttime) or under different ambient conditions (e.g., rain, snow, sun glare, etc.) may have poorer experiences with the wearable devices.

Examples of the present disclosure examine geospatial applications in physical and virtual environments by using ambient computing and applying contextual filters to test the accessibility and inclusion of the applications. In one example, a contextual filter may simulate an application user who has a specific limitation, where the limitation may relate to a disability (e.g., a vision or hearing impairment, a physical disability, a speech impairment (e.g., a speech or verbalization disorder, a language barrier), or the like), a mobility or orthopedic impairment, some mental health conditions, a location, a time, or a context (e.g., a cultural or religious limitation, being accompanied by a child, a pet, or another individual, or the like). The contextual filters may be applied to the application inputs, outputs, and/or underlying datasets. These and other aspects of the present disclosure are discussed in greater detail below in connection with the examples of FIGS. 1-3.

To further aid in understanding the present disclosure, FIG. 1 illustrates an example system 100 in which examples of the present disclosure for using contextual filters to test the accessibility and inclusion of geospatial applications may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. In one example, the core network 102 may include at least one application server (AS) 104, at least one database (DB) 106, and a plurality of edge routers 128-130. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, $3^{rd}$ party networks, and the like. For example, the operator of the core network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider (e.g., an Internet service provider, or a service provider who provides Internet services in addition to other telecommunication services). The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114, the server(s) 126, the AS 104, other components of the core network 102, devices reachable via the Internet in general, and so forth. In one example, each of the user endpoint devices 108, 110, 112, and 114 may comprise any single device or combination of devices that may comprise a user endpoint device, such as computing system 300 depicted in FIG. 3, and may be configured as described below. For example, the user endpoint devices 108, 110, 112, and 114 may each comprise a mobile device, a cellular smart phone, a gaming console, a set top box, a laptop computer, a tablet computer, a desktop computer, an application server, a bank or cluster of such devices, and the like. In one example, any one of the user endpoint devices 108, 110, 112, and 114 may be operable automatically or by a human user to execute a software application (e.g., a geospatial application) whose accessibility and inclusion may be tested by the AS 104, as discussed in greater detail below.

In one example, one or more servers 126 and one or more databases 132 may be accessible to user endpoint devices 108, 110, 112, and 114 via Internet 124 in general. The server(s) 126 and DBs 132 may be associated with Internet content providers, e.g., entities that provide content (e.g., news, blogs, videos, music, files, products, services, or the like) in the form of websites (e.g., social media sites, general reference sites, online encyclopedias, or the like) to users over the Internet 124. Thus, some of the servers 126 and DBs 132 may comprise content servers, e.g., servers that store content such as images, text, video, and the like which may be served to web browser applications executing on the user endpoint devices 108, 110, 112, and 114 and/or to AS 104 in the form of websites.

Figure 3:
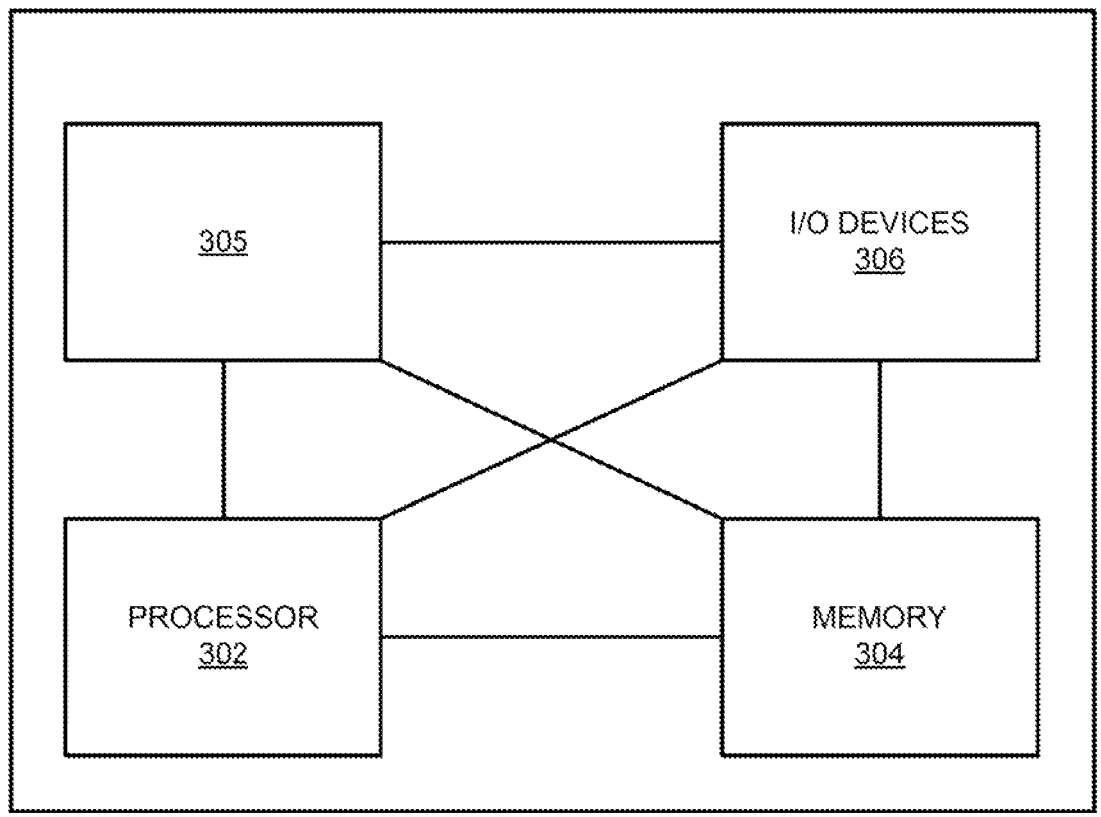
FIG. 3 illustrates an example of a computing device, or computing system, specifically programmed to perform the steps, functions, blocks, and/or operations described herein.

In accordance with the present disclosure, the AS 104 may be configured to provide one or more operations or functions in connection with examples of the present disclosure for using contextual filters to test the accessibility and inclusion of geospatial applications, as described herein. The AS 104 may comprise one or more physical devices, e.g., one or more computing systems or servers, such as computing system 300 depicted in FIG. 3, and may be configured as described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

In one example, the AS 104 may be configured to apply a contextual filter (e.g., retrieved from the DB 106) to the input, the output, and/or the underlying dataset of a software application that is executing on one of the user endpoint devices 108, 110, 112, or 114. In particular, the contextual filter may be configured to mask or discard a portion of the input, the output, and/or the underlying dataset in a manner that simulates a limitation of a user of the software application. In one example, the limitation that is simulated by the contextual filter may comprise at least one of: a disability (e.g., a vision or hearing impairment, a physical disability, a speech impairment (e.g., a speech or verbalization disorder, a language barrier), or the like), a mobility or orthopedic impairment, a mental health condition, a location, a time, or a context (e.g., a cultural or religious limitation, being accompanied by a child, a pet, or another individual, or the like).

The AS 104 may also be configured to provide support for the software application that is executing. For instance, if the software application is a navigation application, the AS 104 may be configured to compute a route from a current location of the user endpoint device 108, 110, 112, or 114 to a user-specified destination and to provide directions to assist a user in following the route.

The AS 104 may collect information gathered by sensors of the user endpoint device 108, 110, 112, or 114 while the software application is executing (with the contextual filters applied). In one example, the AS 104 may analyze the gathered information in order to determine how accessible the software application is for users who experience the limitation that is simulated by the contextual filter. Based on this analysis, the AS 104 may recommend that modifications be made to the software application to improve the accessibility of the software application for users who experience the limitation that is simulated by the contextual filter. For instance, the AS 104 may generate an alert when detecting instances in which a user who experiences the limitation may have difficulty understanding or complying with instructions generated by the software application. The AS 104 may also recommend specific measures or modifications that may be taken to improve the user's ability to understand or comply with the instructions.

In further examples, the AS 104 may use the information gathered by the sensors to generate an accessibility map. In one example, the accessibility map is a dynamic data structure that layers accessibility information on top of geospatial information. The accessibility map may be capable of generating recommendations for users, given a set of data including location, user limitation, context (e.g., weather conditions) and time. Subject to the constraints specified in the set of data, the recommendations may assist users in obtaining any assistance that the users may need to access areas or services within the location.

The DB 106 may store a plurality of contextual filters. Each contextual filter may be configured to simulate a different user limitation when applied to the input, the output, and/or the underlying dataset of a software application (or a hardware device). For instance, one contextual filter may be configured to mask a portion of a set of audible outputs of a software application, in order to simulate how the set of audible outputs might sound to a user who has a hearing impairment. Another contextual filter may be configured to mask a portion of a set of spoken inputs, in order to simulate how a software application may recognize utterances spoken by users who speak with different accents.

In one example, the DB 106 may comprise a physical storage device integrated with the AS 104 (e.g., a database server or a file server), or attached or coupled to the AS 104, in accordance with the present disclosure. In one example, the AS 104 may load instructions into a memory, or one or more distributed memory units, and execute the instructions for using contextual filters to test the accessibility and inclusion of geospatial applications, as described herein. One example method for testing the accessibility and inclusion of geospatial applications using contextual filters is described in greater detail below in connection with FIG. 2.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108, 110, 112, and 114 may communicate with the core network 102 via different access networks, user endpoint devices 110 and 112 may communicate with the core network 102 via different access networks, and so forth. Thus, these and other modifications are all contemplated within the scope of the present disclosure.

Figure 2:
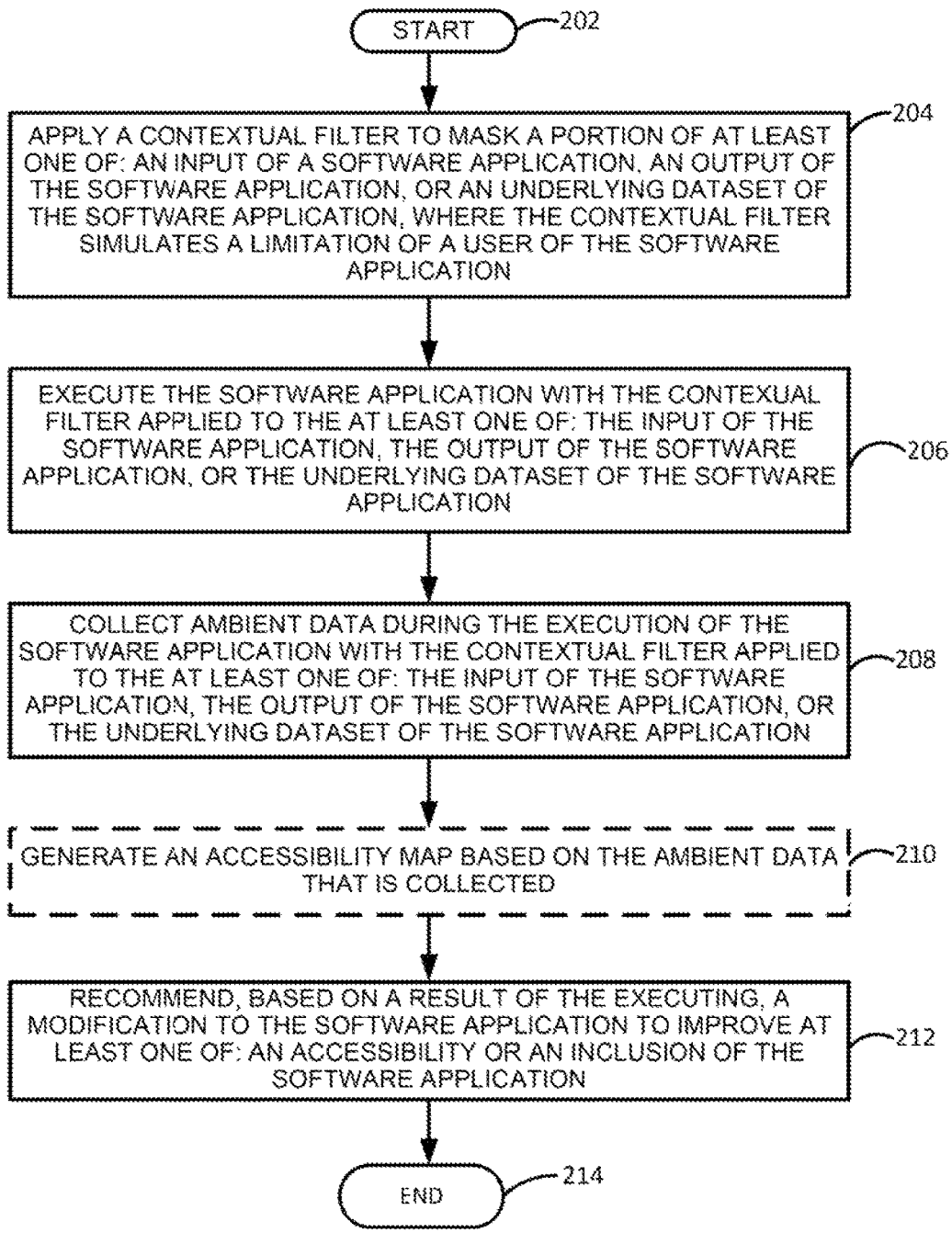
FIG. 2 illustrates a flowchart of an example method for testing the accessibility and inclusion of geospatial applications, in accordance with the present disclosure.

FIG. 2 illustrates a flowchart of an example method 200 for testing the accessibility and inclusion of geospatial applications, in accordance with the present disclosure. In one example, steps, functions and/or operations of the method 200 may be performed by a device as illustrated in FIG. 1, e.g., AS 104 or any one or more components thereof. In another example, the steps, functions, or operations of method 200 may be performed by a computing device or system 300, and/or a processing system 302 (e.g., having at least one processor) as described in connection with FIG. 3 below. For instance, the computing device 300 may represent at least a portion of the AS 104 in accordance with the present disclosure. For illustrative purposes, the method 200 is described in greater detail below in connection with an example performed by a processing system, such as processing system 302.

The method 200 begins in step 202 and proceeds to step 204. In step 204, the processing system may apply a contextual filter to mask a portion (i.e., less than an entirety) of at least one of: an input of a software application, an output of the software application, or an underlying dataset of the software application, where the contextual filter simulates a limitation of a user of the software application.

In one example, the software application is an application that is to be tested to determine how accessible and/or inclusive the software application is. In one example, the software application may be a geospatial software application, such as a navigation application, a location-based augmented reality game, a location-based recommendation system, a geospatial search tool, or the like.

In one example, a contextual filter is a function that masks or hides part of the input, the output, or the underlying dataset of the software application, based on spatio-temporal and/or other contextual conditions. The function therefore simulates or imitates a limitation of a user of the software application. In one example, the limitation that is simulated by the contextual filter may comprise at least one of: a disability (e.g., a vision or hearing impairment, a physical disability, a speech impairment (e.g., a speech or verbalization disorder, a language barrier), or the like), a mobility or orthopedic impairment, a mental health condition, a location, a time, or a context (e.g., a cultural or religious limitation, being accompanied by a child, a pet, or another individual, or the like). Multiple contextual filters could be applied at the same time to simulate different limitations simultaneously. For instance, multiple contextual filters could be applied at the same time to mask multiple different portions of the input, to mask multiple different portions of the output, to mask multiple different portions of the underlying dataset, or to mask a combination of a portion of the input, a portion of the output, and/or a portion of the underlying dataset.

Different programming paradigms may facilitate the implementation of the contextual filter. For instance, in one example, aspect-oriented programming may be leveraged to add behavior instructions to the source code of the software application without modifying the source code itself. In another example, composition filters may be used to provide a mechanism for adding contextual filters on incoming and outgoing messages, thereby controlling the behavior of objects in the source code of the software application. In some examples, these paradigms can be administered in mobile software applications. By using context-aware aspects and changing the behavior of the software application based on context, the contextual filter can be applied according to location, times, and/or nearby users.

In step 206, the processing system may execute the software application with the contextual filter applied to the at least one of: the input of the software application, the output of the software application, or the underlying dataset of the software application.

For geospatial applications, masking of the portion of the input, the output, or the underlying dataset of the software application may depend on the location and time at which the software application is to be executed. For instance, for a navigation application that generates voice instructions and sounds (e.g., spoken directions and sounds to alert a user to route recalculations), masking a portion of the output of the navigation application may help to determine how accessible the navigation application is for users who have hearing impairments. Masking a portion of an underlying dataset of the navigation application, where the underlying dataset may include businesses, road segments, and means of public transportation that are unsuitable for users who use wheelchairs, may help to determine how accessible the navigation application is for users who use wheelchairs. If the navigation application recognizes user voice commands (e.g., spoken indications of a desired destination to which to navigate), then a portion of the input of the navigation application may be not so much masked as modified to help to determine how accessible the navigation application is for users who speak with different accents (e.g., by dropping the trailing consonant).

In one example, the processing system may execute the software application (with the contextual filter applied) in a real world environment. In another example, the processing system may execute the software application (with the contextual filter applied) in a virtual environment, such as in the metaverse. Within this context, the term "metaverse" is understood to refer to an immersive virtual environment that provides an enhanced sense of presence within digital spaces and within which users can remotely interact with each other (e.g., using virtual reality and augmented reality devices). For instance, a digital twin of a real world location may provide an environment in which to test the software application. In this case, the contextual filter(s) could be applied to one or more user avatars that are present in the digital twin.

In step 208, the processing system may collect ambient data during the execution of the software application with the contextual filter applied to the at least one of: the input of the software application, the output of the software application, or the underlying dataset of the software application.

In one example, the processing system may collect the ambient data from one or more sensors with which the processing system is in communication. For instance, if the contextual filter masks an input of the application in such a way as to simulate the use of a wheelchair (or other forms of limited mobility, such as the use of a walker, a baby stroller, or the like), then the processing system may collect data from a global positioning system (GPS) or similar sensor. The processing system may infer, from the data collected from the GPS, which locations in an environment are and are not accessible to a user who uses a wheelchair. For example, the processing system may detect that a specific subway entrance was bypassed even though the bypassed entrance was closer than another subway entrance. Similarly, if the contextual filter masks an output of the application in such a way as to simulate a hearing impairment, then the processing system may collect data from a microphone that records ambient sounds. The processing system may then perform one or more recognition processing techniques on the recorded ambient sounds in order to determine whether the recorded ambient sounds can be recognized with a threshold confidence.

In optional step 210 (illustrated in phantom), the processing system may generate an accessibility map, based on the ambient data that is collected in step 208. An "accessibility map" is understood within this context to refer to a geospatial map that includes a layer of information regarding accessibility. In one example, the accessibility map is a dynamic accessibility map that may be continuously updated as new ambient data is collected. The accessibility map may be specific to a given location and may specify, for particular areas and services that are available in the given location, how a user with a particular limitation may be able to best access those areas and services. For instance, the accessibility map may recommend that a person who has a hearing impairment request to be seated in a particular area of a restaurant that is less prone to ambient noise, or may direct a person who is accompanied by children to a companion restroom.

In step 212, the processing system may recommend, based on a result of the executing performed in step 206, a modification to the software application to improve at least one of: an accessibility of the software application or an inclusion of the software application.

For instance, the processing system may determine (with or without the aid of human review) that a navigation application is less accessible for users who have mobility impairments than it is for users who do not have mobility impairments. Consequently, the processing system may recommend that the navigation application consider generating alternate routes for users whose mobility may be limited. Similarly, the processing system may determine that the colored routes that are displayed by the navigation application are difficult for users who experience color blindness to distinguish (e.g., less heavily traveled green routes are indistinguishable from more heavily traveled red routes). Consequently, the processing system may recommend adapting the color scheme of the display to make it easier for users who experience color blindness to distinguish between different colored routes, e.g., using different gray scales, different hashing patterns, and the like.

The method may end in step 214.

It should be noted that the method 200 may be expanded to include additional steps or may be modified to include additional operations with respect to the steps outlined above. In addition, although not specifically specified, one or more steps, functions, or operations of the method 200 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

Thus, examples of the present disclosure may use contextual filters to simulate specific user limitations, in order to test to what extent users who have those specific user limitations may be able to use a software application. In one example, testing of the software application using the contextual filters accounts for the context in which the software application may be used as well. For instance, a smart watch may be tested with contextual filters applied in order to determine how useful the smart watch is for users whose arms may have limited ranges of motion. However, the smart watch may also have a voice command feature, which may work better in some locations than in other locations (e.g., quieter locations versus louder locations). In addition, the smart watch may have a touch screen. In some contexts (e.g., eating at a restaurant, shopping with friends, or the like), a user may be able to obtain assistance from nearby individuals to operate the touch screen. However, in other contexts (e.g., driving, exercising, or the like), fewer other individuals may be nearby to assist. One or more contextual filters could help to determine the limitations of the smart watch by disabling the functionalities of the smart watch according to context and examining edge cases (e.g., disabling the touch screen while the user is driving or exercising, disabling the voice command feature while the user is in a noisy location, or the like). This would give a person testing or developing the smart watch to experience use of the smart watch as a user with a limitation would experience during use of the smart watch.

Moreover, as discussed above, the examples disclosed herein could be used to simulate and test for accessibility related to some mental health conditions. In the same way that physical obstacles may limit access to places for people who experience mobility limitations (e.g., use of a wheelchair or baby stroller), certain conditions in a place may also limit access for people who experience some mental health conditions, such as social anxiety disorders, attention deficit disorders, sensory processing disorders, autism, and other conditions. For instance, if access requires standing in a line for a long period of time (e.g., as to access a ride in an amusement park or a popular tourist attraction) or walking down steep stairs, these conditions could be intimidating for a person who has autism. Similarly, if access requires traversing a narrow hallway or using an elevator, these conditions could be intimidating for a person who experiences claustrophobia. As another example, if access requires riding in a glass elevator or being in a room with floor-to-ceiling windows, these conditions could be intimidating for a person who is afraid of heights.

In one example, an accessibility map may include information about the types of mental health conditions for which a particular location could limit accessibility. Geospatial applications could then use the accessibility map to filter out locations that are considered inaccessible (e.g., when recommending a restaurant, a tourist attraction, a route, or the like). For instance, for a hypothetical user who is afraid of heights, an application that recommends tourist attractions may be tested by filtering out locations that are considered likely to be uncomfortable for people who are afraid of heights, in order to see if the application is able to suggest alternatives. As an example, if accessing a particular location requires riding in a glass elevator (which may be expected to make a person who is afraid of heights uncomfortable), the test may determine whether the application is able to identify other means of accessing the same location (e.g., stairs, non-glass elevators, etc.). Similarly, for a hypothetical user who experiences social anxiety, the test of a navigation application may filter out routes through areas with high levels of pedestrian traffic (e.g., Times Square in NYC), crowded public transportation, and the like. In this case, whether a place is likely to be crowded or experience high levels of pedestrian traffic may vary based on time, so context is relevant.

Although the use of contextual filters has largely been discussed above within the context of testing for accessibility and inclusion, contextual filters may also have additional uses. For instance, contextual filters could be used to help develop software applications that can also accommodate users with specific limitations. For instance, testing software applications and hardware devices can help to discover accessibility issues and to find features of the software applications and hardware devices that do not work well for all users. When accessibility issues are detected, these accessibility issues should be fixed where possible. For instance, many fitness tracker devices measure user progress and activity in steps, which is unsuitable for users who use wheelchairs. An adapted measure of user progress and activity would increase the inclusiveness of the fitness trackers. For instance, if a fitness tracker takes as an input the arm movements of a walking or running person and translates the arm movements of the walking or running person into a number of steps, an adapted measure might instead take as input the arm movements of a person in a wheelchair and translate the arm movements of the person in the wheelchair into a different activity level (rather than a number of steps).

Developers can add supporting accessibility features to software applications and hardware devices. For instance, for users who use wheelchairs or push strollers, a recommendation system could propose locations and routes that are suitable for wheelchairs and strollers. For users who have vision impairments, sounds and voice commands could be designed to replace the visual display of a software application (such adaptation could also be useful to help with sun glare, even for users wo do not have vision impairments). For users who have hearing impairments, visual displays, vibrations, and/or closed captioning could replace sounds and voices.

Effective accommodations should be contextual and consider location, time, and/or the nearby presence of other individuals. For instance, audible outputs (voice commands, sounds, etc.) may be of limited help to a user who is standing on a noisy subway platform, visual displays may be impractical for a user who is driving, and locations that are easily accessible on dry, sunny days may be more difficult to access when the sidewalks are covered in ice or snow. Thus, contextual accommodations can be applied and tested for a variety of contexts and in a variety of locations.

Moreover, software applications and hardware devices can be specifically designed for users with particular limitations in order to increase the accessibility of software applications, services, and facilities. However, this requires awareness of developers, which can be enhanced by allowing the developers to experience the world the way a user with a particular limitation would experience the world. Contextual filters can be used in combination with augmented reality technology in order to simulate this experience for developers. For instance, a smartphone display could be used to present images of the world as a user with a vision impairment sees the world. This would give developers a better understanding as to how such a user would cope with stop lights, street signs, and the like. An augmented reality application could also be used to generate an overlay that can show developers real world locations that are inaccessible to users who use wheelchairs or push strollers. This could guide the developers in adapting geospatial recommendation systems to such users.

In further examples, contextual filters could be used to test the effects of assistive features, like closed captioning, machine learning-based translation of sign language, text to speech, speech to text, and the like. Testing the effects can help developers to determine when and where such assistive features might be most helpful to users.

There are some cases in which interactions with other people may be necessary in order to fully test the accessibility of a software application or hardware device. In some examples, the metaverse could be leveraged to enable these interactions. As discussed above, the term "metaverse" is understood to refer to an immersive virtual environment that provides an enhanced sense of presence within digital spaces and within which users can remotely interact with each other (e.g., using virtual reality and augmented reality devices). The metaverse may also serve as an accessibility tool, for instance to support telemedicine and facilitate access to healthcare services; however, such support requires that the metaverse itself also be accessible.

To leverage the metaverse for effective testing of accessibility and inclusion, real world environments should be modeled in the metaverse as accurately as possible (e.g., as digital twins). Contextual filters can be applied to avatars (e.g., digital representations of people) to limit users of the avatars and to let those users experience different limitations. For instance, the contextual filters could affect what the users see and/or hear in the metaverse, could limit the mobility of the users within the metaverse, or could make interactions with other users within the metaverse more complicated. Such an approach would not only allow users to experience limitations of different types, but would also help software application developers to examine the effects of different limitations on social interactions.

The use of virtual worlds such as the metaverse could facilitate simulations of different contexts, such as different locations, different times (e.g., morning versus night), different weather conditions (e.g., sunny and clear versus blizzard), and different crowd conditions (e.g., large crowds versus few other people present). The use of digital twins may allow, for instance, the developers of a location-based game to test the game in different locations and to verify the same user experience across the different locations. Virtual environments may also allow developers to test hardware such as tracking devices for effects on user privacy.

Further examples of the present disclosure may leverage ambient intelligence to test accessibility in the real world. Ambient intelligence combines artificial intelligence with ubiquitous computing (or pervasive computing), context awareness, and personalization in order to smoothly adapt the behavior of software applications to user needs (and in a manner that is substantially transparent to the user). Ambient intelligence and wearable devices may support geospatial accessibility and inclusion by collecting relevant data to test accessibility of software applications and hardware devices, by providing accessibility tools to enhance accessibility of software applications and hardware devices, and by facilitating communication regarding user limitations.

As an aid to data collection, wearable devices (such as smart watches, fitness trackers, virtual reality headsets, and the like) may collect data for machine learning applications. The nature of the collected data may vary. For instance, accurate location data for a user in a wheelchair may be used for creating machine learning models that distinguish between locations that are inaccessible and accessible to users in wheelchairs. Recorded sounds can be used for learning when and where users with hearing impairments may need assistance.

Collected data could be used for training machine learning models, to predict accessible locations based on context, and for detecting accessibility flaws in the machine learning models. For instance, access to places and systems is often controlled based on biometric data (e.g., facial recognition, where users who are recognized as authorized users may be granted access and users who are not recognized as authorized users may not be granted access). Sometimes, however, the underlying technology of the biometric authorization systems may be biased, which can lead to recognition failures resulting in false positives and/or false negatives. Access data may help developers to detect recognition failures and to improve the biometric authorization systems. Ambient intelligence could make data collection seamless and machine learning guided, so that data is collected only when data is needed.

As an aid for providing accessibility tools, ambient intelligence can be utilized to adapt hardware devices and software applications to different users. For instance, sounds and voice instructions could be automatically replaced by haptic feedback and closed captioning for users who have hearing impairments. The closed captioning could be provided in various languages to increase inclusion. The color schemes and brightness levels of hardware devices could be adapted based on user requirements and/or time of day. Thus, ambient intelligence can be used to provide features and functionality that assist users with various limitations. As an example, a hardware device could alert a user to hazards such as ice on a sidewalk and could recommend an alternative venue or walking route based on the presence of hazards and/or mobility impairments of the user.

As an aid for facilitating communication, ambient intelligence can allow hardware devices to connect to each other to communicate issues relating to accessibility. For instance, ambient intelligence could be leveraged to send alerts to the devices of other individuals in the area around a user when the user needs assistance or attention. As an example, a software application on a smart phone might guide an elderly user to an empty seat on a subway car or might send a message to the devices of other people on the subway car to ask if any of the other people would give up their seat for the elderly user. In such an instance, the software application or smart phone may seek the permission of the elderly user to request assistance from the other people on the subway car before sending the message. Smart phone software applications and wearable devices could also interact with automatic or Internet-connected doors, doorbells, streetlights, escalators, elevators, and the like. By automatically transmitting the limitations of a user to these automatic or Internet-connected doors, doorbells, streetlights, escalators, elevators, and the like, supporting actions (e.g., opening a door, ringing a doorbell, increasing the brightness of a streetlight, slowing the speed of an escalator, calling an elevator, or the like) can be smoothly facilitated. Accessibility can be increased for users who cannot perform these actions or who may function better in the adapted environment.

In further examples, collected data and accessibility testing results can be combined to create accessibility maps. As discussed above, an "accessibility map" is understood within this context to refer to a geospatial map that includes a layer of information regarding accessibility. Formally, an accessibility map may contain geospatial objects and an accessibility function $f$. If D is a set of limitations, L is a set of locations, T is a set of times, C is a set of records with contextual information (e.g., weather conditions, sunlight intensity, etc.), A is a set of actions, I is a set of textual information snippets, and V is a set of visual symbols, then $$f:D \times L \times T \times C \rightarrow A \cup I \cup V \qquad \text{(EQN. 1)}$$

maps a given tuple of limitation, location, time, and context to an action, an information snippet, or a visual (map) symbol.

For instance, for a location of "train station" and a limitation of "user in wheelchair," the function $f$ may return an information snippet "no access." For a location of "building lobby" and a limitation of "user has hearing impairment," the function $f$ may return an action of "notify doorman of hearing impairment" and/or "collect data about success of accessing building." The accessibility map may be temporal and dynamic (i.e., may change over time). The dynamic nature of the accessibility map, as well as the accessibility map's ability include actions and address different types of limitations, to provide an improvement over conventional, static accessibility maps.

It should be noted that dynamic accessibility maps such as that discussed above should not create privacy risks by exposing identifying user information. Classification of accessible locations could use machine learning and could be updated and improved constantly based on newly collected data. The accessibility maps could then be used to create contextual filters and simulations in virtual environments such as the metaverse. Accessibility maps could also specify actions for wearable devices according to limitation, location, time, and/or context. In this case, the accessibility maps could provide the information needed to execute ambient intelligence on smart phones and other devices.

FIG. 3 depicts a high-level block diagram of a computing device or processing system specifically programmed to perform the functions described herein. As depicted in FIG. 3, the processing system 300 comprises one or more hardware processor elements 302 (e.g., at least one central processing unit (CPU), a microprocessor, or a multi-core processor), a memory 304 (e.g., random access memory (RAM) and/or read only memory (ROM)), a module 305 for using contextual filters to test the accessibility and inclusion of geospatial applications, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200 or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 305 for using contextual filters to test the accessibility and inclusion of geospatial applications (e.g., a software program comprising computer-executable instructions) can be loaded into memory 304 and executed by hardware processor element 302 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for using contextual filters to test the accessibility and inclusion of geospatial applications (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
   applying, by a processing system including at least one processor, a contextual filter to mask a portion of at least one of: an input of a software application, an output of the software application, or an underlying dataset of the software application, where the contextual filter simulates a limitation of a user of the software application;
   executing, by the processing system, the software application with the contextual filter applied to the at least one of: the input of the software application, the output of the software application, or the underlying dataset of the software application;
   collecting, by the processing system, ambient data during the executing;
   recommending, by the processing system based on a result of the executing, a modification to the software application to improve at least one of: an accessibility of the software application or an inclusion of the software application; and
   generating, by the processing system, an accessibility map, based on the ambient data.

2. The method of claim 1, wherein the software application is a geospatial application.

3. The method of claim 1, wherein the limitation of the user comprises at least one of: a disability, a mobility or orthopedic impairment, a mental health condition, a location, a time, or a context.

4. The method of claim 1, wherein the contextual filter is applied without changing a source code of the software application.

5. The method of claim 1, wherein the executing is performed in a real world environment.

6. The method of claim 1, wherein the executing is performed in a virtual environment.

7. The method of claim 6, wherein the virtual environment comprises a digital twin of a real world environment.

8. The method of claim 7, wherein the applying comprises applying the contextual filter to an avatar of the user, where the avatar is present in the digital twin.

9. The method of claim 1, wherein the ambient data is collected from one or more sensors in communication with the processing system.

10. The method of claim 1, wherein the modification improves the at least one of: the accessibility of the software application or the inclusion of the software application for users who have the limitation that is simulated by the contextual filter.

11. The method of claim 1, wherein the accessibility map is updated as new ambient data is collected.

12. The method of claim 1, wherein the accessibility map includes a function that outputs at least one of: a recommended user action, an information snippet, or a visual symbol in response to an input tuple, wherein the input tuple includes a user limitation, a location, a time, and a context.

13. The method of claim 1, wherein the modification comprises a modification to at least one of: a visible output of the software application, an audible output of the software application, a haptic output of the software application, a processing of an audible input by the software application, or a processing of the underlying dataset by the software application.

14. The method of claim 1, wherein the contextual filter is applied in combination with at least one of: augmented reality technology or another contextual filter that masks another portion of the at least one of: the input of the software application, the output of the software application, or the underlying dataset of the software application.

15. The method of claim 1, wherein the executing is performed in conjunction with a wearable device.

16. The method of claim 1, wherein the modification comprises enabling the software application to communicate with user endpoint devices of other users.

17. The method of claim 1, wherein the modification comprises enabling the software application to communicate with an Internet-connected system on behalf of the user.

18. A non-transitory computer-readable medium storing instructions which, when executed by a processing system including at least one processor, cause the processing system to perform operations, the operations comprising:

applying a contextual filter to mask a portion of at least one of: an input of a software application, an output of the software application, or an underlying dataset of the software application, where the contextual filter simulates a limitation of a user of the software application;

executing the software application with the contextual filter applied to the at least one of: the input of the software application, the output of the software application, or the underlying dataset of the software application;

collecting ambient data during the executing;

recommending, based on a result of the executing, a modification to the software application to improve at least one of: an accessibility of the software application or an inclusion of the software application; and generating an accessibility map, based on the ambient data.

19. The non-transitory computer-readable medium of claim 18, wherein the accessibility map is updated as new ambient data is collected.

20. A device comprising:

a processing system including at least one processor; and a non-transitory computer-readable medium storing instructions which, when executed by the processing system, cause the processing system to perform operations, the operations comprising:

applying a contextual filter to mask a portion of at least one of: an input of a software application, an output of the software application, or an underlying dataset of the software application, where the contextual filter simulates a limitation of a user of the software application;

executing the software application with the contextual filter applied to the at least one of: the input of the software application, the output of the software application, or the underlying dataset of the software application;

collecting ambient data during the executing;

recommending, based on a result of the executing, a modification to the software application to improve at least one of: an accessibility of the software application or an inclusion of the software application; and generating an accessibility map, based on the ambient data.

\* \* \* \* \*